(12) United States Patent
Grace et al.

(10) Patent No.: US 6,399,159 B1
(45) Date of Patent: *Jun. 4, 2002

(54) HIGH-EFFICIENCY PLASMA TREATMENT OF POLYOLEFINS

(75) Inventors: Jeremy M. Grace, Penfield; Louis J. Gerenser, Webster; Kurt D. Sieber, Rochester; Michael J. Heinsler, Rochester; Hengzhong K. Zhuang, Rochester; Dennis R. Freeman; Mark M. Romach, both of Spencerport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,490

(22) Filed: May 19, 2000

Related U.S. Application Data

(63) Continuation-in-part of application No. 09/349,288, filed on Jul. 7, 1999, now Pat. No. 6,149,985.

(51) Int. Cl.$^7$ ................................................ H05H 1/00
(52) U.S. Cl. ........................ 427/536; 427/261; 427/322; 427/402; 427/569
(58) Field of Search ................................ 427/536, 261, 427/569, 322, 402; 118/723 E

(56) References Cited

U.S. PATENT DOCUMENTS

| | | |
|---|---|---|
| 3,288,638 A | 11/1966 | Van Paassen et al. |
| 3,309,299 A | 3/1967 | Mantell |
| 3,549,406 A | 12/1970 | Ambusk |
| 4,451,497 A | 5/1984 | Dolezalek et al. |
| 5,223,338 A | 6/1993 | Maljotra |
| 5,224,441 A | 7/1993 | Felts et al. |
| 5,324,414 A | 6/1994 | Spahn et al. |
| 5,354,813 A | 10/1994 | Farooq et al. |
| 5,403,955 A | 4/1995 | Farooq |
| 5,493,117 A | 2/1996 | Tamaki et al. |
| 5,538,841 A | 7/1996 | Grace et al. |
| 5,563,029 A | 10/1996 | Grace et al. |
| 5,895,558 A | 4/1999 | Spence |
| 6,149,985 A | * 11/2000 | Grace et al. |

FOREIGN PATENT DOCUMENTS

| | | |
|---|---|---|
| EP | 0 758 687 A1 | 2/1997 |
| JP | 1 029 702 A2 | 8/2000 |
| WO | WO 94/28568 | 12/1994 |
| WO | WO 97/42257 | 11/1997 |

OTHER PUBLICATIONS

Surfaces & Coatings Technology 93 1997 pp. 261–264, Polymer Surface Modification by Plasma Source Ion Implantation, by Seunghee Han, Yeonhee Lee, Haidong Kim, Gon–ho Kim, Junghey Lee, Jung–Hyeon Yoon, Gunwoo Kim (No month avail.).

(List continued on next page.)

*Primary Examiner*—Bernard Pianalto
(74) *Attorney, Agent, or Firm*—Mark G. Bocchetti

(57) ABSTRACT

A method and apparatus are taught for treating polyolefin containing or polyolefin-coated webs or laminates for obtaining the proper surface characteristics to promote adhesion of photosensitive coating materials and/or layers typically coated thereon. The web is passed through a high-voltage sheath region or dark space of the plasma generated by a powered electrode residing in a discharge zone. The frequency of the driving voltage must be above a lower bound dictated by the properties of the paper support and the plasma, and it must be below an upper bound beyond which the sheath voltages drop significantly and it is observed that the benefits of this approach diminish. The dark space is generated by a treatment electrode in a treatment zone. There is a counter electrode having a surface area in said treatment zone which is at least as great as the surface area of the treatment electrode. A power supply is included for driving the treatment electrode with an oscillating high voltage at a frequency less than about 2 MHz and greater than $1/t_c$ where $t_c$ is the charging time of a web surface exposed to a rms ion current in the plasma.

21 Claims, 8 Drawing Sheets

OTHER PUBLICATIONS

Rarefied Gas Dynamics: Experimental Techniques and Physical Systems, vol. 158 Progress in Astronautics and Aeronautics, Materials Processing in Dual–Mode Microwave/Radiofrequency Plasmas by J.E. Klemberg–Sapieha et al. (No date avail.).

Glow Discharge Processes: Sputtering and Plasma Etching, by Brian Chapman, John Wiley & Sons, 1980, pp. 52–71, 80–81, 112–113, 156–169 (No month avail.).

Dual–Frequency N2 and NH3 Plasma Modification of Polyethylene and Polymide by J.E. Klemberg–Sapieha et al, J Vac Sci Technol A 9 (6), Nov./Dec. 1991, pp. 2975–2981.

Tappi 65 (8) 1982 pp. 75–78, the Theory and Practice of Corona Treatment for Improving Adhesion, by R.H. Cramm and D.V. Bibee (No month avail.).

J Adhesion Sci Technol 3 (5) 1989, pp. 321–335, Low–Molecular–Weight Materials on Corona–Treated Polypropylene, by M. Strobel, C. Donatov, J.M. Strobel, C.S. Lyons, S.J. Perron and M.C. Morgen (No month avail.).

J. Vac Sci Technol A 16 (3), May/Jun. 1998, pp. 1710–1715, Surface Studies of Plasma Source Ion Implantation Treated Polystyrene, by Yeonhee Lee, Seunghee Han, Jung–Hye Lee, Jung–Hyeon Yoon, Hyun Eui Lim, and Kang–Jin Kim.

IEEE Transactions on Industry Applications, vol. 1A–11 No. 3, May/Jun. 1975, pp. 328–335, Electrical Characterization of a Corona Discharge for Surface Treatment, by L.A. Rosenthal and D.A. Davis.

* cited by examiner

HIGH-EFFICIENCY PLASMA TREATMENT OF POLYOLEFINS

CROSS-REFERENCE TO RELATED APPLICATIONS

This is a continuation-in-part application of U.S. application Ser. No. 09/349,288, filed Jul. 7, 1999 and now U.S. Pat. No. 6,149,985, by Jeremy M. Grace, et al., and entitled, "HIGH EFFICIENCY PLASMA TREATMENT OF IMAGING SUPPORTS".

FIELD OF THE INVENTION

This invention relates generally to the manufacture of polyolefin imaging supports and supports having polyolefins at the surface thereof and, more particularly, to a method and apparatus for obtaining the proper surface characteristics to promote adhesion of photosensitive coating materials and/or layers typically coated thereon.

BACKGROUND OF THE INVENTION

Electrical discharge treatments are widely used-o promote adhesion of a variety of organic and inorganic layers to organic polymer substrates. Examples of the use of electrical discharge treatments are found in U.S. Pat. No. 5,538,841 and references cited therein. Additional examples are found in European Pat. Application EP 0 758 687 A1 and references cited therein, as well as well as World Pat. WO 97/42257. A variety of treatment geometries (i.e. positioning of the article to be treated relative to the discharge electrodes, shape of the electrodes, and shape of the article to be treated) are possible (see, for example U.S. Pat. Nos. 3,288,638 and 3,309,299).

The need to treat continuous sheets or rolls of polymeric support material (i.e., webs) has generally led to treatment apparatus design for the purposes of conveying a web through an electrical discharge zone. This purpose has been achieved either by suspending the polymer article in a free span between conveyance rollers, as disclosed in U.S. Pat. No. 5,493,117 or on a drum, as disclosed in U.S. Pat. No. 4,451,497 and U.S. Pat. No. 5,224,441. U.S. Pat. Nos. 4,451,497 and 5,493,117, as well as U.S. Pat. No. 5,538,841, all intend to provide surface treatments for use in the manufacture of photographic imaging elements on polyester supports. Dolazalek et al. (U.S. Pat. No. 4,451,497) disclose an apparatus for conveying a polymer web material into a vacuum chamber, through a treatment zone, and out of the vacuum chamber. The treatment configuration taught is essentially a corona treatment geometry wherein the web travels along a rotating drum that is surrounded by a plurality of discharge electrodes. The objective is to prepare a substrate to be coated with photographic emulsion.

Tamaki et al. (U.S. Pat. No. 5,493,117) disclose an apparatus similar to that of Dolazalek et al. having the similar purpose of providing a support useable for a photosensitive material. However, Tamaki et al. suspend the web in free span between conveyance rollers and have a plurality of treatment electrodes located on either side of the free span in order to treat both sides of the web simultaneously.

Felts et al. (U.S. Pat. No. 5,224,441) disclose a plasma treatment and coating apparatus wherein the web is conveyed over the surface of an electrified drum, facing a grounded counter electrode.

Grace et al. (U.S. Pat. No. 5,538,841) disclose nitrogen-based and oxygen-based surface chemistries that promote adhesion of gelatin-containing layers to respective nitrogen-plasma-treated and oxygen-plasma-treated polyester webs, also for the manufacture of supports usable for photosensitive materials.

A common technique in the industry for treatment of paper surfaces at atmospheric pressures is corona discharge treatment (CDT) (R. H. Cramm and D. V. Bibee, Tappi, 65 (8), pp.75–8, 1982; and W. J. Ambusk, U.S. Pat No. 3,549, 406, 1970). As typically practiced, this treatment is more accurately described as a dielectric barrier discharge treatment. As mentioned above, a typical geometry consists of a drum with a series of electrodes placed at a specified radius from the center of the drum. Furthermore, a dielectric layer of insulating material having suitable thickness so that it does not break down at the applied voltages is placed on either the drum or the electrodes. This layer is called the dielectric barrier. At the pressures typically used (i.e. 1 atmosphere) the treatments are generally carried out in air, and efforts to change the dominant treatment chemistry from oxygen to something other than oxygen are not successful. Although air is composed of 80% nitrogen, oxygen is much more reactive than nitrogen, therefore, oxygen present in the discharge treatment zone dominates the gas-phase chemistry. Furthermore, entrained air (present as a layer of gas carried on the moving web surface as it enters the treatment device) provides a considerable source of oxygen, even when the treatment zone is enclosed and purged with an oxygen-free gas.

The typical gas-phase chemistry in a dielectric barrier discharge in air also produces unwanted species such as ozone and oxides of nitrogen, (NOx) both of which must be eliminated from the work environment with pollution abatement technology. These species, in particular the oxides of nitrogen, can also have undesirable effects on the treated surfaces, as they may interact with coatings applied to the treated surfaces. In addition, the use of dielectric barrier discharges to treat polyolefins has been demonstrated to produce a water washable treated layer (M. Strobel, C. Dunatov, J. M. Strobel, C. S. Lyons, S. J. Perron and M. C. Morgen, *J. Adhesion Sci. Technol.* 3 (5), p326, 1989). This washable layer can have adverse consequences for adhesion of applied layers subsequently coated from a solution in water.

Better control of the treatment gas environment can be achieved at reduced pressures (i.e., using a vacuum process). At reduced pressures, the method of conveyance of the web material through the treatment zone has an important effect on the nature of the plasma treatment. In the case of Tamaki et al., the polymer surface to be treated is electrically floating in the discharge zone and moves past one or more powered discharge electrodes. In the case of Dolazalek et al., if the drum is electrically isolated from the walls of the apparatus, the article also is electrically floating in the discharge zone and moves past one or more powered discharge electrodes. If the drum is electrically grounded, however, the surface potential of the polymer article is determined by several factors. These factors include thickness and dielectric properties of the article, the driving frequency of the discharge, the electron density and plasma potential of the discharge, and the relative areas of the discharge electrode and the combination of the drum surface and the grounded inner walls of the apparatus. At a sufficiently low driving frequency (the upper limit being determined by the aforementioned characteristics of the article and plasma), the article surface will charge to the floating potential and the situation will be similar to that of an electrically isolated drum. At a sufficiently high driving frequency (the lower limit being determined by aforementioned characteristics of the article and plasma) the surface of the article will remain near ground potential. Consequently, if the effective grounded surface area in the discharge zone is significantly larger than that of the powered electrode(s), the surface of the article to be treated is generally bombarded by ions having a bombardment energy that is largely determined by the difference between a plasma potential of some tens of volts and a ground potential.

In contrast, if the areas of the powered electrode(s) and the effective grounded electrode are comparable, the ion bombardment of the polymer article will be largely determined by the potential applied to the powered electrode and can have a peak value of several hundred volts or more. In this case, the ion bombardment energies are more characteristic of an etch process. The etching character of the process can be further enhanced by reducing the area of the polymer article, supporting electrode (e.g., drum), and effective grounded surface area relative to that of the driven electrode(s), or by electrically isolating the supporting electrode of reduced area and applying the driving voltage thereto. The effect of the relative areas of driven and grounded electrodes on the effective bombarding potentials at their respective surfaces is well known to those skilled in the art of plasma processing for microelectronics. In that art it is known that alternating-current discharges established between a driven electrode and a ground electrode of equal size produce similar bombardment effects at either electrode. It is also known that alternating-current discharges established between electrodes of dissimilar area produce more bombardment at the smaller electrode. It is further known that higher frequency discharges operate at lower amplitudes of driving voltage (for comparable input power). Thus the bombarding potential is also reduced as driving frequency increases. The aforementioned behavior of the bombarding potential at the electrode surfaces applies reasonably well throughout the radio frequency range (i.e., ~3 kHz to ~100 MHz). For the purposes of surface modification of polymer webs, treatments in which significant ion bombardment and etch processes may occur have generally been avoided in the prior art related to supports for photographic elements. While the object of polymer surface modification is generally to introduce new chemical species into the surface region by reaction with species in the electrical discharge, the object of etch processes is to remove significant amounts of material from the surface region. Furthermore, these etch processes are considered undesirable because the materials to be modified tend to be temperature sensitive and etch processes can generate substantial heat or may generate considerable low-molecular-weight fragments in the surface region of the treated support.

Examples of background art that teach away from using etch-like processes for the purposes of polymer surface modification are found in the open literature. J. E. Klemberg-Sapieha et al., *J. Vac. Sci. Technol.* A, 9 (6), 1991, pp. 2975–81, disclose a dual-frequency approach to modification of polymer surfaces in nitrogen plasma and in ammonia plasmas. In their work, the high-frequency microwave power couples effectively to the bulk of the discharge zone and generates the chemically active species in the plasma. By applying a lower frequency (rf: 13.56 MHz) potential to the substrate holder, they create a significant bias potential, which results in significant bombardment of the substrate (i.e. polymer article being treated) by ions extracted from the plasma. Their work shows clearly that the maximum amount of nitrogen incorporated into the treated polymer surface is for the microwave plasma with no applied rf potential. As the rf potential is applied (resulting in bias potentials of up to 500 V) the incorporated nitrogen decreases for both nitrogen and ammonia plasmas and for both polymers studied in their work (i.e., polyethylene and polyimide). While dual-frequency approach has shown much success for tailoring the properties of hard coatings such as silicon nitride and diamond-like carbon (see for example, J. E. Klemberg-Sapieha et al. in *Rarefied Gas Dynamics: Experimental Techniques and Physical Systems*, B. D. Shizgal and D. P. Weaver, eds., *Progress in Astronautics and Aeronautics*, vol. 158, A. R. Seebass, Editor-in-chief, American Institute of Aeronautics and Astronautics, Inc., 1993), the application of this approach to polymer surface modification has suggested that enhanced ion bombardment by use of a low-frequency bias is generally disadvantageous.

Another example of using a plasma source with a separately biased sample holder is found in the work of S. Han et al., *Surface Coatings Technology*, 93, 1997, pp. 261–4, and Lee et al., *J. Vac. Sci. Technol.*, A 16(3), 1998, pp. 1710–15. Han et al. and Lee et al. use an rf(13.56 MHz) inductively coupled plasma source (with magnetic enhancement) in combination with a pulse generator used to apply short (10–20 $\mu$s) high-voltage (up to -10 kV) pulses to the substrate holder. In their work, Han et al. and Lee et al. found that the use of high-voltage pulses alone to generate a discharge and effect surface modification is less effective than the use of the rf plasma in combination with high-voltage pulses applied to the substrate holder. Furthermore, they found that the use of the rf-driven plasma alone is less effective than in combination with the high-voltage pulses.

The results for the use of the high-voltage pulses alone are consistent with the findings of Klemberg-Sapieha et al. (described above) that applying a bias voltage to the substrate holder is not advantageous for polymer surface modification. In contrast, the results for the combination of an rf plasma and high-voltage pulses as compared to the rf plasma alone appears to show some interesting effects. The apparatus as described by Han et al. and Lee et al., however, has several drawbacks. First, the high-voltage pulses are short (microseconds) and must be applied repetitively (1 kHz, e.g.) for significant time (several minutes) to modify polymer surfaces to the degree shown by Han et al. and Lee et al. Second, the apparatus requires rf power to be applied in an inductively coupled configuration, high-voltage pulsing electronics, and permanent magnets. Third, the apparatus as described is clearly designed to treat small articles such as silicon wafers, as opposed to wide continuous rolls of web. All of the above drawbacks present complications for application of this technology to high-speed treatment of polymer supports.

Grace et al. disclose the use of nitrogen plasmas and oxygen plasmas to treat polyester supports for promoting the adhesion of aqueous coatings thereto. Using low-frequency (60 Hz–40 kHz) discharges with the polyester support electrically floating in the plasma, Grace et al. found nitrogen-containing and oxygen-containing surfaces that are demonstrated to promote excellent adhesion between gelatin-containing layers and plasma-treated polyester supports. The doses demonstrated to produce good adhesion are in the range of 0.5–4 J/cm$^2$. (This dose parameter is calculated based on the delivered power, the width of the treatment zone and the web speed: Dose=Power /[width×web speed] ). In this dose range, treatment times of 1 s and somewhat below are readily attainable on the manufacturing scale. Grace et al. teach the appropriate surface chemistry for the given application and disclose optimized treatment parameters. Neither the use of substrate bias voltage, nor the use of an etch-mode plasma treatment are disclosed, nor is it suggested that such approaches should be more effective at obtaining the desired surface chemistry. The present invention relates to the efficient production of surfaces bearing chemical similarity to those disclosed by Grace et al. The present invention further relates to the use of the high-efficiency treatment configuration for efficient surface treatment of polyolefin webs or surface treatment of supports coated with polyolefin resins.

SUMMARY OF THE INVENTION

It is therefore an object of the present invention to provide a method and apparatus for obtaining high-efficiency plasma treatments of imaging supports and polymeric support materials which have polyolefins at the surface thereof using nitrogen or oxygen plasmas.

It is a further object of the present invention to provide a method and apparatus for obtaining high-efficiency plasma treatments of imaging supports and polymeric support materials which have polyolefins at the surface thereof at low treatment doses, comparable to or better than those obtained by CDT and without the adverse effects of production of NOx and ozone, and without the adverse effects of a water washable surface layer.

Still another object of the present invention is to provide a method and apparatus for obtaining high-efficiency plasma treatments of imaging supports and polymeric support materials which have polyolefins at the surface thereof with reduced power consumption.

Yet another object of the present invention is to provide a method and apparatus for obtaining high-efficiency plasma treatments of imaging supports and polymeric support materials which have polyolefins at the surface thereof with increased treatment speed.

A further object of the present invention is to provide high-efficiency treatments requiring simple power supplies and using low-density capacitively coupled plasmas, as opposed to magnetically enhanced plasmas, microwave plasmas, or scenarios requiring fast high-voltage pulses.

Still another object of the present invention is to reduce required treatment times and/or reduce the treatment powers required to produce surface treated polymers which have polyolefins at the surface thereof suitable for production of imaging elements, photographic supports, and film bases.

Briefly stated, the foregoing and numerous other features, objects and advantages will become readily apparent upon a review of the detailed description, claims and drawings set forth herein. These features, objects and advantages are accomplished by passing the support having polyolefins at the surface thereof (e.g. web comprising a polyolefin surface) through the high-voltage sheath region of the plasma generated by a powered electrode residing in a discharge zone. The frequency of the driving voltage must be above a lower bound dictated by the properties of the polymer support and the plasma, and it must be below an upper bound beyond which the sheath voltages drop significantly and it is observed that the benefits of this approach diminish. Like Lee et al. and Han et al., it has been found that the present invention is an improvement over the use of a simple rf plasma (driven at 13.56 MHz) to treat webs. In contrast, however, it has also been found that significant improvements in treatment efficiency are gained by placing the web on the treatment electrode and by reducing the driving frequency considerably below 13.56 MHz. These improvements are gained without the need for a second power source, such as the high-voltage pulse source described by Han et al. and Lee at al. Furthermore, the treatments can be carried out in a continuous mode rather than a pulsed mode. These results are demonstrated for a single treatment electrode and do not require a plurality of electrodes as taught by Dolazalek et al. and Tamaki et al. Finally, these results are demonstrated for a low-density, capacitively coupled plasma source, without the need for magnetic enhancement or inductive coupling as used by Han et al. and Lee et al. The demonstrated treatment improvements reduce the required treatment dose by an order of magnitude, thus enabling significant increases in web conveyance speed and/or significant reductions in applied power to effect a surface treatment.

The efficiency of the method of the present invention is evidenced by significant treatment effect at low treatment doses (where dose is as described above). Low treatment doses translate to manufacturing benefits in terms of increased treatment speed, reduced power consumption, or a combination of both.

While the present invention relates to providing adhesion between polymer coatings or laminates and plasma-treated supports wherein the supports have polyolefins at the surface thereof, it should be apparent to those skilled in the art that it may be applied to other kinds of coatings on plasma-treated polymer supports. This invention may be applied to any coating capable of favorable chemical interaction with amines or imines (as resulting from nitrogen plasma treatment or treatments in gases mixed with nitrogen-containing molecules) or hydroperoxy, ether, epoxy, hydroxyl, carboxyl, or carbonyl groups (as resulting from oxygen plasma treatment or treatments in gases mixed with water vapor or gases mixed with other gases having oxygen atoms in the molecular structure). For example, the present invention can be applied to metallized plastics, such as for example silver coated on polyesters (as described in U.S. Pat. No. 5,324,414). It can also be applied to latex polymer dispersions or polymer solutions coated onto plasma-treated polymer supports. It can further be applied to coating of hydrophilic colloid layers onto plasma-treated supports. It can also be applied to grafting of selectively reactive species onto plasma-treated supports such as, for example, vinylsulfone hardening agents used as tie layers or anchors, as described in Grace et al. (U.S. Pat. No. 5,563,029). It can also be applied to lamination or extrusion of polymer layers onto plasma-treated supports.

The term "polyolefin-containing surface" as used herein is intended to include polyolefin webs and webs having polyolefins at the surface thereof such as, for example, a paper web with a polyethylene coating or layer applied thereto.

The term "paper" as used herein are intended to include paper stock, plain paper, paper that has been laminated with polyolefin resins, or inorganic oxide filled polyolefin resins, non-transparent polymeric supports and synthetic papers, and transparent polymeric supports.

DESCRIPTION OF THE PREFERRED EMBODIMENT

Figure 1:
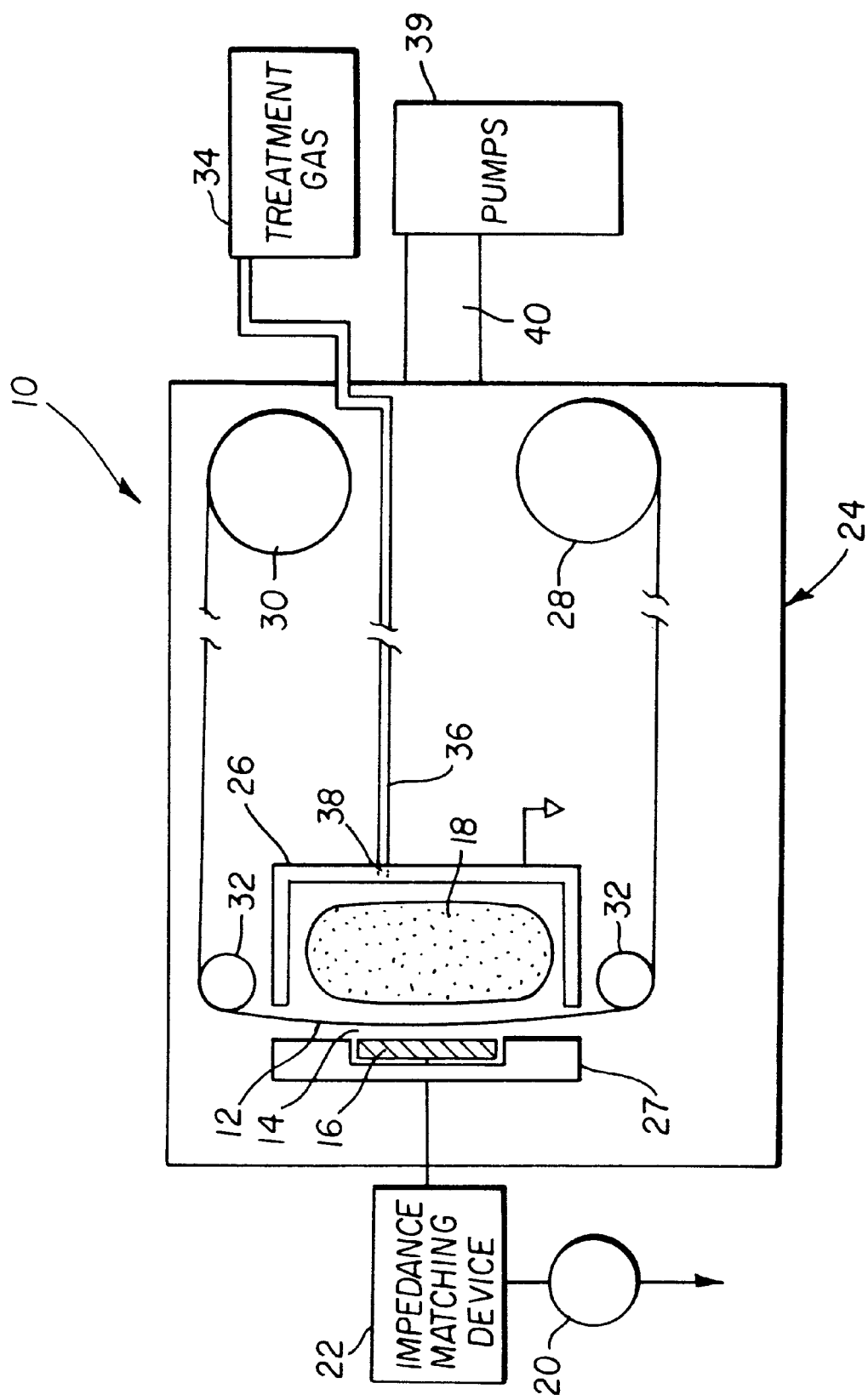
FIG. 1 is a schematic depicting a first embodiment of the treatment apparatus of the present invention.

Turning first to FIG. 1, there is schematically depicted a treatment apparatus 10 wherein the web 12 having a polyolefin-containing surface does not touch an electrode, but in contrast to the floating web configuration, the space 14 between the web 12 and the driven (smaller) treatment electrode 16 is a "dark space" (see B. Chapman, *Glow Discharge Processes: Sputtering and Plasma Etching*, John Wiley & Sons (New York, 1980). The term "dark space" as used herein is defined as a region wherein the breakdown voltage is locally higher than in other regions of a plasma-containing volume; it can also be a volume wherein proximity of surfaces and their associated losses prevents bulk ionization and thus prevents screening of electric fields. A dark space can be created by positioning of grounded surfaces near electrodes, or it can occur naturally by generation of a plasma sheath region near an electrode. Dark spaces are characterized by low luminosity, low ion density, and the lack of ability to screen out considerable electric fields. The dark space 14 supports the strong electric field that results from applying a high voltage to the treatment electrode 16, and the surface of the web 12 essentially serves as the electrode in contact with the plasma 18. Alternating high-voltage is applied by use of a power supply 20 and an appropriate impedance matching device 22. The extent of the dark space 14 is determined by the working gas and pressure thereof, the applied voltage and power, the driving frequency, and geometrical factors such as the distance between the web 12 and other surfaces in the chamber 24, including that of a second or counter electrode 26. The plasma zone is defined by an enclosure. The enclosure preferably comprises second electrode 26 and shield 27 for the treatment electrode 16. Alternatively, the enclosure for the plasma zone can be the vacuum chamber 24 itself. The treatment zone is in the dark space 14 between the treatment electrode 16 and the plasma 18. Although not shown, those skilled in the art will recognize that the treatment electrode 16 and second electrode 26 should be cooled as appropriate for heat load taking into account the material from which the treatment electrode 16 and second electrode 26 are made.

The path of web 12 is defined by a web drive/conveyance system which includes take-up roller 28, unwind roller 30, and idler rollers 32 as well as any other devices required to convey the web 12 from the unwind roller 30 through the treatment zone, and to the take-up roller 28. Treatment gas 34 is provided to the treatment zone by a suitable gas delivery line 36 and inlet 38, which can be a showerhead or some other arrangement of suitable openings into the treatment zone. For operation with treatment gases other than air, the region outside the treatment zone is pumped to below the treatment pressure using appropriate pumps 39 and plumbing 40. For operation in air, the treatment zone may be pumped, and the external chamber 24 may provide the flow of treatment gas.

Figure 2:
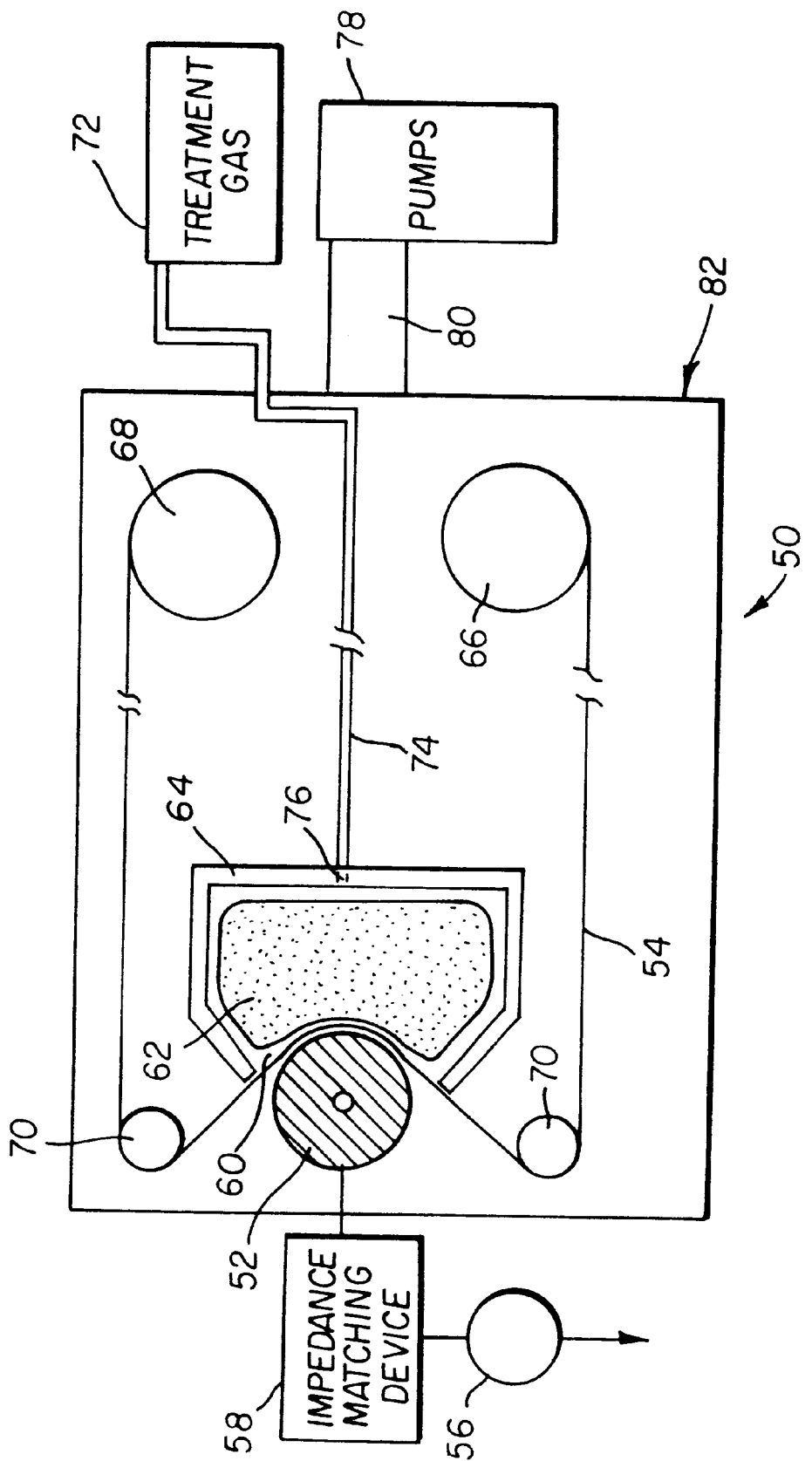
FIG. 2 is a schematic depicting an alternative embodiment of the treatment apparatus depicted in FIG. 1.

Looking next at FIG. 2, there is schematically illustrated an apparatus 50 which is an alternative embodiment of the apparatus 10 depicted in FIG. 1. Apparatus 50 has a configuration in which an electrically isolated roller 52 is used as a treatment electrode (driven and smaller electrode). The web 54 having a polyolefin-containing surface is placed against the roller 52, and alternating high voltage is applied to the roller 52 by use of a power supply 56 and an impedance matching device 58. As in FIG. 1, there is a dark space 60, a plasma 62, and a second or counter electrode 64. The second electrode 64 may be used to define the discharge volume.

The path of web 54 is defined by a web drive/conveyance system which includes take-up roller 66, unwind roller 68, and idler rollers 70 as well as any other devices required to convey the web 54 from the unwind roller 68 through the treatment zone, and to the take-up roller 66. Treatment gas 72 is provided to the treatment zone by a suitable gas delivery line 74 and inlet 76, which can be a showerhead or some other arrangement of suitable openings into the treatment zone. For operation with treatment gases other than air, the region outside the treatment zone is pumped to below the treatment pressure using appropriate pumps 78 and plumbing 80. For operation in air, the treatment zone may be pumped, and the external chamber 82 may provide the flow of treatment gas.

Figure 3:
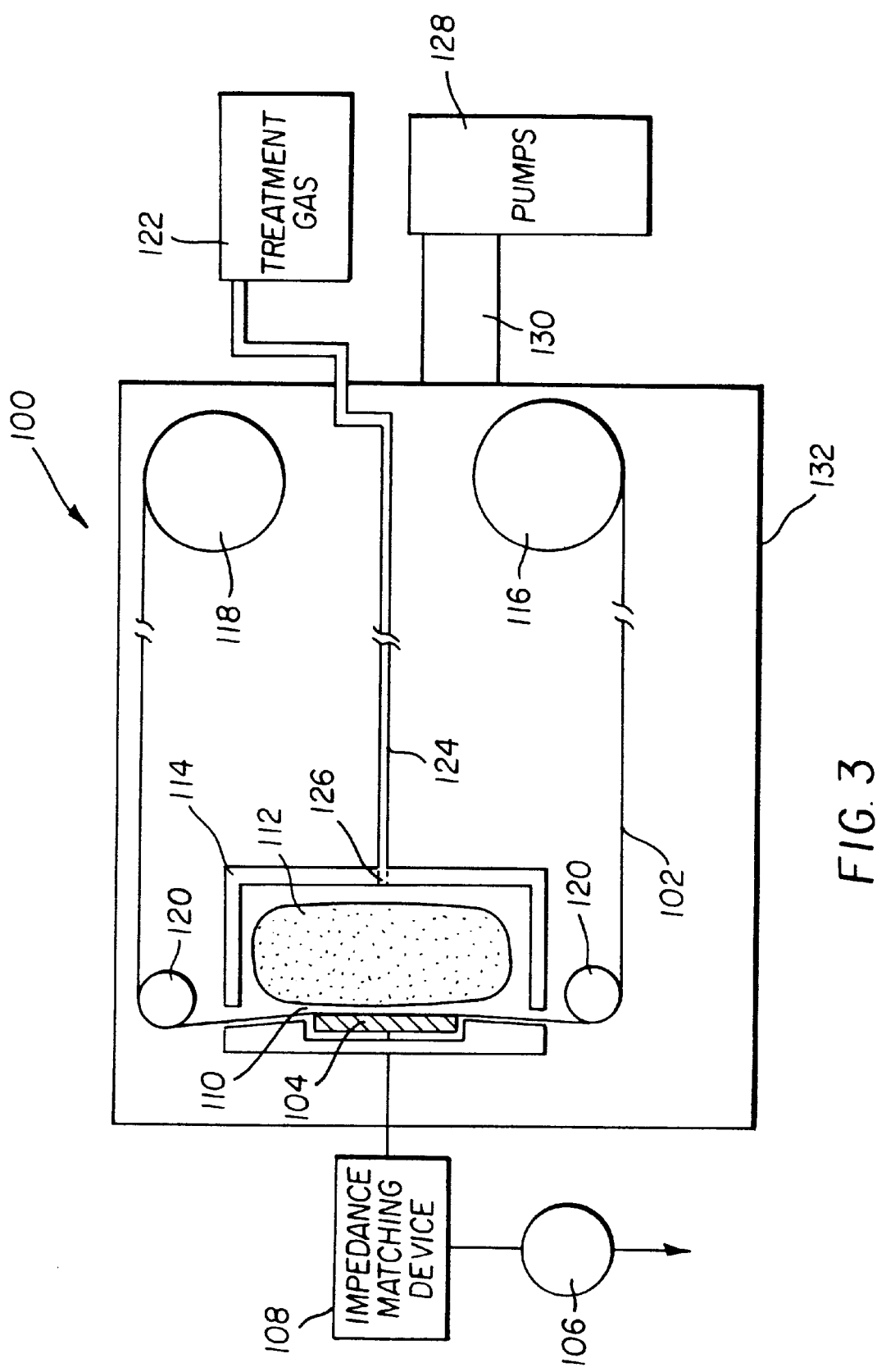
FIG. 3 is a schematic depicting another alternative embodiment of the treatment apparatus depicted in FIGS. 1 and 2.

FIG. 3 schematically illustrates an apparatus 100 which is yet another alternative embodiment of the apparatus 10 and the apparatus 50 depicted in FIGS. 1 and 2, respectively.

Apparatus 100 has a treatment configuration in which the rear surface of the web 102 is in contact with a stationary, electrically driven (smaller) electrode 104. Web 102 includes a polyolefin-containing surface. Alternating high voltage is applied to the electrode 104 by use of a power supply 106 and appropriate impedance matching device 108. As in FIG. 1, there a dark space 110, a plasma 112, and a second or counter electrode 114. As shown, the second electrode 114 may be used to define the discharge volume. The path of web 102 is defined by a web drive/conveyance system which includes take-up roller 116, unwind roller 118, and idler rollers 120, as well as any other devices required to convey the web 102 from the unwind roller 118 through the treatment zone, and to the take-up roller 116. Treatment gas 122 is provided to the treatment zone by a suitable gas delivery line 124 and inlet 126, which can be a showerhead or some other arrangement of suitable openings into the treatment zone. For operation with treatment gases other than air, the region outside the treatment zone is pumped to below the treatment pressure using appropriate pumps 128 and plumbing 130. For operation in air, the treatment zone may be pumped, and the external chamber 132 may provide the flow of treatment gas.

The exact configuration of web drive/conveyance system, chambers, enclosures and pumps is dictated by the required treatment pressure, the required treatment gas purity, and the quality of any seals made between higher and lower pressures by baffling, nip rollers, or the like in the web path. While the web drive/conveyance system is indicated to be within the vacuum chamber 24, 50, 132, the treatment geometries depicted in FIGS. 1–3 may readily be incorporated into an "air-to-air" device, wherein the wind and unwind rollers are placed outside the vacuum chamber 24, 50, 132, and the web 12, 54, 102 passes through differentially pumped regions and appropriate pressure seals (i.e., constricted openings and baffles or nip regions) placed before and after the treatment zone.

In the practice of the present invention, a web 12, 54, 102 having a polyolefin-containing surface is conveyed through a plasma zone such that the surface to be treated lies in the sheath region (dark space 14, 60, 110) of a driven electrode 16, 52, 104. Furthermore, the area of the driven electrode 16, 52, 104 is significantly smaller than the area of the counter electrode 26, 64, 114 or grounded surface area, such that the peak voltage drop across the driven electrode sheath is comparable to twice the amplitude of the driving voltage. The driving frequency is lower than 13.56 MHz, is chosen (as described above) based on the charging time of the polymer surface, and is preferably 450 kHz or lower.

The treatment gas 34, 72, 122 may contain nitrogen or oxygen, mixtures of nitrogen- or oxygen-containing gases with inert gases (such as argon or helium), mixtures of nitrogen with hydrogen-containing gases (such as hydrogen, water, or ammonia), mixtures of oxygen with oxygen containing gases (such as carbon dioxide or water), or mixtures of nitrogen and oxygen (such as air). The treatment gas 34, 72, 122 may also contain water vapor or mixtures of water vapor with inert or reactive gases. For reasons of safety and cost, the treatment gas 34, 72, 122 is preferably nitrogen, oxygen or mixtures thereof and is chosen depending on the desired surface chemistry on the polymer support 12, 54, 102 to be treated. Treatment pressures and gas flows must also be adjusted for the desired surface chemical effects and can be optimized by those skilled in the art. The maximum possible operating pressure at which a glow-discharge plasma exists in the treatment zone is determined by the gas, the geometry of the treatment zone, and the mode of establishing and sustaining the discharge.

The web 12, 54, 102 having a polyolefin-containing surface may contain aliphatic hydrocarbons, aromatic hydrocarbons, ester groups, or combinations thereof, the exact composition being dictated by the usage and function of the article to be coated. The coating may be gelatin-containing layers or any required coating where the adhesion thereof to webs is promoted by the presence of or is known to be reactive with amines or imines, as produced by nitrogen plasma treatment. The coatings may also be any required coatings where the adhesion thereof to webs is promoted by the presence of or is known to be reactive with hydroperoxy, ether, hydroxyl, epoxy, carbonyl and carboxyl groups as produced by oxygen or water plasma treatment.

Preferably, the coatings applied to the treated webs are: hydrophilic colloid layers, such as gelatin, and blends thereof with hydrophilic nonphotosensitive polymers; amine reactive hardening compounds, such as bisvinylsulfonylmethane, or blends thereof with gelatin or hydropbilic nonphotosensitive polymers; or polymeric hardeners containing amine-reactive side groups. Alternatively, hydrophyllic colloid layers such as photographic emulsions made with gelatin, or typical coatings applied as the bottom layer of a photographic emulsion pack (e.g., antihalation layers, antistatic layers, curl control layers, and the like) can be applied to the treated polymer supports 12, 54, 102. The coatings may also include ink receiving layers. They may also include polyolefin films.

Polymer extrudates, laminates, or coatings applied to treated supports having a polyolefin-containing surface are those where the adhesion to webs is promoted by the presence of or is known to be reactive with amines or imines reactive (in the case of treatments with nitrogen containing plasmas) or hydroperoxy, ether, epoxy, hydroxyl, carbonyl, or carboxyl groups (in the case of treatments with oxygen containing plasma or water containing plasmas).

Figure 4:
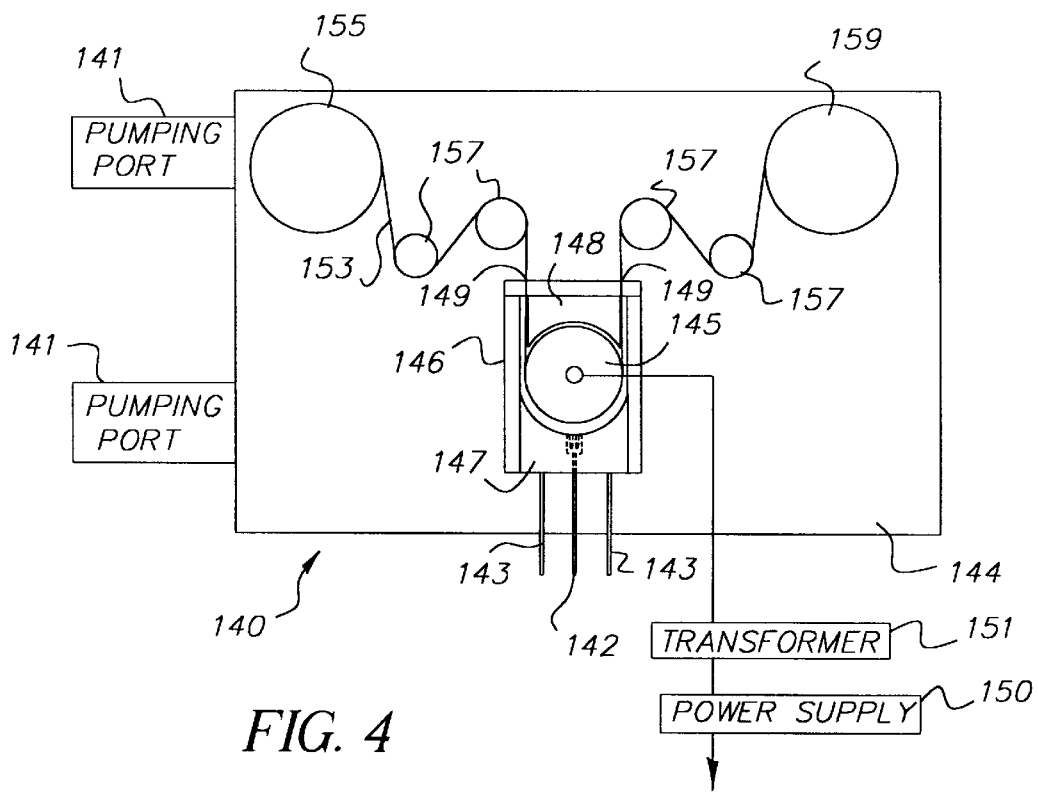
FIG. 4 is a cross-sectional schematic of a test apparatus of the present invention used to conduct the 40 kHz treatments of Experiment 1.

Looking next at FIG. 4, there is shown a cross-sectional schematic of a test apparatus 140 used to construct the examples described below. This apparatus is based on the treatment geometry shown in FIG. 2. The test apparatus includes a stainless steel rotating electrode 145 which is mounted in an aluminum enclosure 146, which is mounted inside the chamber 144 of a vacuum web coating machine. A grounded, water-cooled aluminum counter electrode 147 is positioned opposite the rotating electrode 145 as shown. A power supply 150 is connected to a transformer 151, which is connected to a rotating electrical contact to apply power to the rotating electrode 145. A dark space shield 148 is placed behind the rotating electrode 145 to prevent dissipation of power over the unused portion thereof The rotating electrode 145 has an outer diameter of 12.7 cm and a length of 33 cm. The counter electrode 147 is machined to have a radius of curvature of 8.9 cm, with the curved surface placed a distance of 2.54 cm from the circumference of the (treatment) rotating electrode 145, resulting in a gap of 2.54 cm (between the rotating electrode 145 and the counter electrode 147) in which a plasma is ignited. A gas inlet 142 and cooling lines 143 are attached to appropriate channels incorporated into the counter electrode assembly. Treatment gas enters the plasma treatment gap through two rows of holes located on the counter electrode surface near the center of the treatment device. Mechanical pumps (not shown) and diffusion pumps (not shown) are used to achieve rough vacuum and high vacuum, respectively, via pumping ports 141. The web 153 is conveyed from an unwind roller 155 over idler rollers 157 through the treatment device and to a take up roller 159. The web enters and exits the treatment device via slits 149.

The specifics of the invention relate to plasma treatment of polyolefin supports, polyolefin-coated supports, and web materials otherwise containing polyolefin materials for the aforementioned purposes. Nonetheless, it should be apparent to those skilled in the art that the same concepts (i.e. appropriate placement of the article to be treated, combined with appropriate choice of driving frequency as described herein) may prove fruitful for boosting the efficiency of plasma treatments of other polymer supports for other purposes. For example, the high-efficiency approach described herein can be applied in general to polyesters, such as for example poly(ethylene terephthalate) (PET), polycycloalkylene terephthalates (such as, poly(cyclohexylene dimethylene terephthalate)), and poly(ethylene napthalate) (PEN); blends of polyesters with other polyesters, such as poly(ethylene terephthalate) blended with poly(ethylene naphthalate), poly(ethylene terephthalate) blended with poly(cyclohexylene dimethylene terephthalate) (PCHDMT), poly(cyclohexylene dimethylene terephthalate) blended with poly(ethylene napthalate), poly(ethylene terephthalate) blended with polyarylates, poly(ethylene napthalate) blended with polyarylates, and poly(cyclohexylene dimethylene terephthalate) blended with polyarylates; polyesters blended with polycarbonates, such as PET, PEN, or PCHDMT with the polycarbonates of bisphenol-A, polycarbonates of 3,3,5-trimethylene-bisphenol, or copolycarbonates containing both bisphenols; polyesters blended with polyetherimide (PEI), such as PEN blended with PEI, PET blended with PEI, and PCHDMT blended with PEI; polyolefins, such as for example polyethylene and polypropylene; polystyrenes, such as for example polystyrene (tactic, atactic, or syndiotactic) and poly-α-methyl styrene; acrylesters such as, for example, polymethylmethacrylate; polycarbonates; and cellulose derivatives such as, for example, cellulose triacetate, cellulose acetate butyrate and the like, and wood pulp products such as paper. It may also be applied to polysulfones and polyetherimides. It may also be applied to laminates comprising materials such as mentioned above and other kinds of supports, such as paper or metallic webs. (In the case of metallic webs, additional effort would be required in the design of the treatment zone housing such that a high-voltage sheath is present above the metallic web surface).

Other possible applications include the treatment of supports that will be coated or laminated with ink-receiving layers useful for inkjet printing. Such supports include paper stock, plain paper, paper that has been laminated with polyolefin resins or inorganic oxide filled polyolefin resins, non-transparent polymeric supports and synthetic papers, and transparent polymeric supports. Examples of these include cellulose derivatives such as a cellulose ester, cellulose triacetate, cellulose diacetate, cellulose acetate propionate, cellulose acetate butyrate, polyesters, such as polyethylene terephthalate or polyethylene naphthalate, poly-1,4-cyclohexanedimethylene terephthalate, polybutylene terephthalate, and copolymers thereof, polyimides, polyamides, polycarbonates, polystyrene, polyolefins, such as polyethylene, polypropylene, polysulfones, polyarylates, polyether imides and blends of these. The ink receiving layer useful for inkjet printing can be either porous or non-porous, and can be comprised of water swellable or water non-swellable polymers and mixtures thereof. Water swellable polymers include, for example, gelatin, acetylated gelatin, phthalated gelatin, oxidized gelatin, chitosan, poly(alkylene oxide), poly(ethyleneoxide), poly(vinyl alcohol), modified poly(vinyl alcohol), sulfonated polyester, partially hydrolyzed poly(vinylacetate/vinyl alcohol), poly(acrylic acid), poly(sodium styrene sulfonate), poly(2-acrylamido-2-methane sulfonic acid), poly(vinylpyrrolidone) and vinylpyrrolidone-containing copolymers, poly(ethyl oxazoline) and oxazoline-containing copolymers, polyacrylamides and acrylamide-containing copolymers, poly(vinyl methyl ether), poly(vinyl ethyl ether), hydroxyethylcellulose, hydroxypropylcellulose, hydroxy propyl methylcellulose, methylcellulose, and mixtures thereof. Water non-swellable polymers include, for example, cellulose esters such as cellulose diacetates and triacetates, cellulose acetate propionate, cellulose acetate butyrate, cellulose nitrate, polyacrylates such as polymethyl methacrylate, polyphenylmethacrylate and copolymers with acrylic or methacrylic acid, or sulfonates, polyesters, polyurethanes, polysulfones, urea resins, melamine resins, urea-formaldehyde resins, polyacetals, polybutyrals, epoxies and epoxy acrylates, phenoxy resins, polycarbonates, vinyl acetate polymers and copolymers, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers, styrene-butadiene, and mixtures thereof. Mixtures of water swellable and water non-swellable polymers can also be used. The ink receiving layer useful for inkjet printing can also contain organic plastic pigments, polymeric latex particles, or inorganic particles such as, for example, silicon oxide, fumed silica, silicon oxide dispersions such as those available from Nissan Chemical Industries and DuPont Nemours, aluminum oxide, alumina, alumina hydrate, boehmite, amorphous alumina, calcium carbonate, barium sulfate, barium sulfate mixtures with zinc sulfide, nonmagnetic inorganic powders such as δ-aluminum oxide, chromium oxide, iron oxide, tin oxide, doped tin oxide, silicon dioxide, alumino-silicate, titanium dioxide, silicon carbide, titanium carbide, and diamond in fine powder, and mixtures thereof. The ink receiving layer useful for inkjet printing can also contain polymers that include moieties that serve as mordant sites to improve the fixability of an inkjet image, thereby improving waterfastness and smear. Examples of effective mordants include imidazole-containing polymers and copolymers, vinylpyridine-containing polymers and copolymers, chitosan and chitosan derivatives, and polymers containing quaternary ammonium groups. Examples of quaternary ammonium units include trimethylvinylbenzylammonium chloride, benzyldimethylvinylbenzylammonium chloride, dimethyloctadecylvinylbenzyl ammonium chloride and the like. Counterions other than chloride can also be used. U.S. Pat. Nos. 5,223,338, 5,354,813, and 5,403,955, and references cited, discuss additional polymers that would be suitable for use as mordant polymers. Combinations of these can also be used. Other examples of effective mordants include sulfonates and carboxylates of styrene polymers, acrylate polymers, and polyesters.

Samples of 150μ thick paper stock with roughly 25μ thick polyolefin laminates on either side were used. One side had a polypropylene surface and the other side had a polyethylene surface. Rolls of this material were loaded into the vacuum coating apparatus and placed on the unwind roller (155). Depending on which polyolefin was to be treated (i.e., polypropylene or polyethylene), the rolls of material were loaded onto the unwind spindle and threaded accordingly, such that the material of interest was facing the counter electrode (147). The quality of the polyethylene and polypropylene surfaces was assessed by X-ray photoelectron spectroscopy (XPS) prior to the treatment experiments. No contamination was found, and the C 1s and valence region high-resolution spectra were consistent with the stated polymer type on each side of the support. The chamber 144 was pumped to a base pressure below $1\times10^{-4}$ Torr. Oxygen or nitrogen gas (Air Products ultrapure carrier grade) was admitted to the treatment gap between rotating electrode 145 and counter electrode 147 at a flow between 500 and 2000 SCCM. After purging the enclosure 146 at steady state for three (3) minutes, power was applied to the electrode 145 at a specified level for a specified treatment time, dictated by the speed of the moving web and the dimensions of the active surface of the rotating electrode 145. A 40 kHz power supply 150 with a matching transformer 151 were used to apply a high-voltage waveform to the rotating electrode 145 (see FIG. 4).

For comparative purposes, samples were treated by using a plasma source consisting of a pair of water-cooled electrodes arranged in a coplanar configuration. Two 34 cm×7.6 cm×1.3 cm water cooled aluminum electrodes were oriented in the cross-web direction and spaced 0.3 cm apart, side-by-side. The electrode pair was spaced 0.3 cm from the bottom and side walls of a grounded enclosure. The top of the grounded enclosure was 3.6 cm from the top surface of the electrodes. Slits in the side walls of the enclosure defined a web path across the electrode pair at a distance of 3.3 cm between electrode surfaces and web. In this configuration, the web is electrically floating in the plasma. The same power supply and transformer described above was used to apply an alternating high voltage across the two electrodes. Treatments made using this type of apparatus are herein referred to as "floating web treatments".

In addition, polyethylene-coated paper (with no coatings applied to the polyethylene on either side) was treated by CDT. The paper width was 34.3 cm. The paper web was treated using an apparatus consisting of a web transport system and a treater station. The transport system was a Harris Graphics model 403 rewinder/slitter. The roller of the CDT unit, (American Roller, 17.5 cm outer diameter, 43 cm face length, Arcotron CL-500 ceramic dielectric with 0.165 cm wall thickness), was equipped with a ceramic dielectric coating and was electrically grounded. The electrode assembly of the CDT unit consisted of eight (8) titanium bars, 19 cm in length, equally spaced around approximately one-quarter (¼) of the perimeter of the roller. The spacing between the roller and the electrode was adjustable for each electrode and was set at a constant 0.762 mm for each electrode in the treater assembly. Exhaust air flow to the CDT cabinet was held constant at nominally 236l/s during all runs. The corona discharge treater power supply and accompanying transformer was manufactured by Pillar Corporation, (model P1025). This 2.5 kW power supply operates at a nominal frequency of 10 kHz.

The electrical characteristics of the corona discharge process were monitored using digital oscilloscope methods as described by L. A. Rosenthal and D. A. Davis in *IEEE Transactions on Industry Applications*, Vol 1A–11, No.3, May/June, 1975, pp. 328–335. A current probe (Pearson precision current transformer model 110) and a high voltage probe (Tektronix 1000X High Voltage Probe model P6015A) were installed near the treater on the secondary side of the transformer. The signals from these probes were fed to a digital oscilloscope (Tektronix model TDS 544A) and the waveforms were analyzed to provide a measure of the secondary power of the process. The following conditions were used to generate comparative CDT examples:

Web was conveyed at speeds of 274 and 122 m/min with a treatment power of 1.12 kW to provide respective doses of 0.13 and 0.29 J/cm$^2$. Similar treatments were carried out on a pilot-scale corona treatment unit on 12.7 cm wide polyethylene-coated paper stock at doses between roughly 0.02 and 0.10 J/cm$^2$. Additional examples of CDT treatments of polyolefin surfaces, in particular CDT treated polypropylene, were found in the literature (Strobe et al.).

Surface chemical changes in the treated samples were assessed by use of X-ray photoelectron spectroscopy (XPS). The XPS spectra were acquired on a Physical Electronics 5601 photoelectron spectrometer with monochromatic Al Kα X-rays (1486.6 eV). The X-ray source was operated with a 7-mm filament at 300 W. Charge neutralization was accomplished by flooding the sample surface with low energy electrons≦25 mA emission current, ≦0.5 eV bias voltage) from an electron gun mounted nearly perpendicular to the sample surface. The pressure in the spectrometer during analysis was typically≦$3\times10^{-9}$ Torr. For the high resolution spectra, the analyzer was operated at a pass energy of 11.75 eV. Under these conditions, the full width at half maximum (FWHM) for the C 1s peak in an untreated polyolefin surface varied from 0.9 to 1.0 eV. All spectra were referenced to the C 1s peak of the aliphatic carbon atoms, which was assigned a value of 284.6 eV. Line-shape analyses were done using a least squares curve-fitting routine employing line shapes with variable Gaussian-Lorentzian character. Spectra were taken at a 45° electron takeoff angle, which corresponds to an analysis depth of ~5 nm.

For oxygen treatments XPS metrics found to be helpful in assessing changes in surface chemistry are oxygen content and peak fits of the carbon (C 1s) region. The peak fits provide information on the surface concentration of specific carbon functionalities. The carbon 1s peak was broken down into four separate components: aliphatic carbon, carbon associated with ether, epoxy, or hydroxyl groups (C—O), carbon associated with methylenedioxy (O—C—O) or carbonyl (C=O) groups, and carbon associated with carboxylic acid groups (O—C=O). The methodology involves determining the number of components, constraining the peak positions within ±0.1 eV for the pure component, constraining the linewidths to 1.1±0.1 eV for the untreated surface and 1.2±0.1 eV for the treated surfaces, and using lineshapes with between 90 to 100% Gaussian character and 0 to 10% Lorentzian character. The output is the integrated area under each peak. For nitrogen treatments, XPS metric found to be most useful is nitrogen content.

For the purposes of comparison with the present invention, data for CDT of polypropylene from Strobel et al., (M. Strobel, C. Dunatov, J. M. Strobel, C. S. Lyons, S. J. Perron and M. C. Morgen, *J. Adhesion Sci. Technol*, 3 (5), p326 1989), are shown in Table 1. The results for the high-efficiency and floating web plasma treatments of polypropylene are shown respectively in Tables 2 and 3.

TABLE 1

| Dose (J/cm$^2$) | ETOA = 38° O/C | ETOA = 38° Washed O/C |
|---|---|---|
| 0 | 0 | 0 |
| 0.03 | 0.02 | 0.02 |
| 0.05 | 0.03 | 0.03 |
| 0.08 | 0.06 | 0.035 |
| 0.17 | 0.07 | 0.04 |
| 0.17 | 0.09 | 0.08 |

TABLE 1-continued

| Dose (J/cm$^2$) | ETOA = 38° O/C | ETOA = 38° Washed O/C |
|---|---|---|
| 1.7 | 0.12 | 0.06 |
| 1.7 | 0.12 | 0.08 |
| 17 | 0.23 | 0.08 |
| 17 | 0.23 | 0.09 |

Table 1. Comparative example from the prior art: CDT treatment of polypropylene from Strobel et al. (M. Strobel, C. Dunatov, J. M. Strobel, C. S. Lyons, S. J. Perron and M. C. Morgen, J. Adhesion Sci. Technol. 3 (5), p326, 1989).

TABLE 2

| Pressure (Torr) | Web speed (m/min) | Power W | Dose J/cm$^2$ | O Atom % | N Atom % | C Atom % | O/C |
|---|---|---|---|---|---|---|---|
| 0.25 | 152.4 | 449 | 0.054 | 8.5 | 0 | 91.5 | 0.09 |
| 0.25 | 27.4 | 451 | 0.299 | 15.9 | 0 | 84.1 | 0.19 |
| 0.26 | 15.2 | 452 | 0.539 | 15.3 | 0 | 84.7 | 0.18 |
| 0.26 | 15.2 | 452 | 0.539 | 15* | 0* | 85* | 0.18* |
| 0.63 | 15.2 | 211 | 0.252 | 14.1 | 0 | 85.9 | 0.16 |
| 0.97 | 152.4 | 449 | 0.054 | 4.7 | 0 | 95.3 | 0.05 |
| 0.97 | 15.2 | 440 | 0.525 | 12.9 | 0 | 87.1 | 0.15 |

Table 2. Examples of the present invention: treatment conditions and treated polypropylene surface chemistry results for high-efficiency plasma treatments in oxygen at various speeds, powers and pressures. The * denotes results for samples washed in water prior to surface chemical analysis.

TABLE 3

| Pressure (Torr) | Web speed (m/min) | Power W | Dose J/cm$^2$ | O Atom % | N Atom % | C Atom % |
|---|---|---|---|---|---|---|
| 0.075 | 3.8 | 50 | 0.24 | 9.9 | 0.0 | 90.1 |
| 0.075 | 3.8 | 750 | 3.58 | 21.3 | 0.1 | 78.6 |
| 0.15 | 3.8 | 400 | 1.91 | 20.1 | 0.1 | 79.8 |
| 0.2 | 3.8 | 50 | 0.24 | 12.1 | 0.0 | 87.9 |
| 0.2 | 3.8 | 750 | 3.58 | 22.6 | 0.2 | 77.2 |
| 0.225 | 3.8 | 50 | 0.24 | 11.7 | 0.0 | 88.3 |
| 0.225 | 3.8 | 750 | 3.58 | 22.0 | 0.1 | 77.9 |
| 0.35 | 3.8 | 400 | 1.91 | 18.3 | 0.1 | 81.6 |
| 0.5 | 3.8 | 50 | 0.24 | 9.1 | 0.0 | 90.9 |
| 0.5 | 3.8 | 750 | 3.58 | 16.4 | 0.1 | 83.5 |
| 1 | 3.8 | 500 | 2.38 | 10.5 | 0.2 | 89.3 |
| N/A | N/A | 0 | 0 | 0.2 | 0.0 | 99.8 |

Table 3. Examples of floating web oxygen plasma treatments of polypropylene at various powers and pressures.

Comparison of the O/C column for Tables 1 and 2 shows that the high-efficiency plasma treatment is capable of higher levels of oxygen incorporation, but at significantly lower doses than for CDT. This result is illustrated graphically in FIG. 5. In both the tables and the graph of FIG. 5, the comparison is between XPS data taken with an Electron Take-off Angle (ETOA) of 45° for the high-efficiency treatments and data taken with ETOA=38. The O/C ratio at lower ETOA should be enhanced relative to higher ETOA. For the purposes of comparison the effect of ETOA is moot, as the data for the high-efficiency treatments (XPS data taken with ETOA=45°) compare favorably with the data for CDT treatments even for the XPS data taken with ETOA=38°. Furthermore, the analysis of samples rinsed with water shows that CDT produces a water soluble layer of low-molecular-weight oxidized material, whereas the high-efficiency treatments do not produce a washable (water soluble, or soluble in an aqueous solvent) layer (i.e. the results prior to and subsequent to rinsing or washing in water are the same for the high-efficiency plasma treatments). The washable layers have two possible consequences: 1) formation of a weak boundary layer that results in poor adhesion of coatings applied thereto and 2) loss of the beneficial surface chemistry as it dissolves into an applied coating solution during the coating process. The high-efficiency plasma treatment produces comparable chemical surface modification at lower doses than CDT and does not produce a washable layer. Hence clear advantages are demonstrated for the high-efficiency plasma treatments with respect to CDT.

Figure 6:
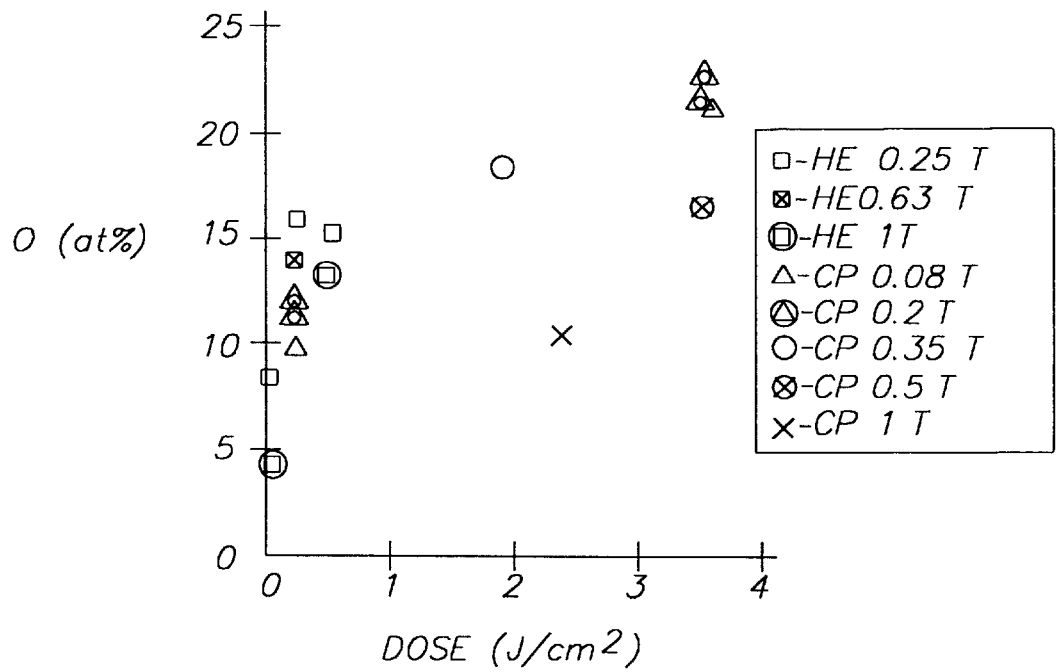
FIG. 6 is a graph plotting surface oxygen as a function of high-efficiency (HE) treatment dose for polypropylene treated using the configuration of FIG. 4 and, for comparison, using a plasma treatment in which the web is electrically floating in the plasma (coplanar electrode configuration, CP). Numbers beside the treatment configuration designation indicate the treatment pressure in Torr.
Figure 7:
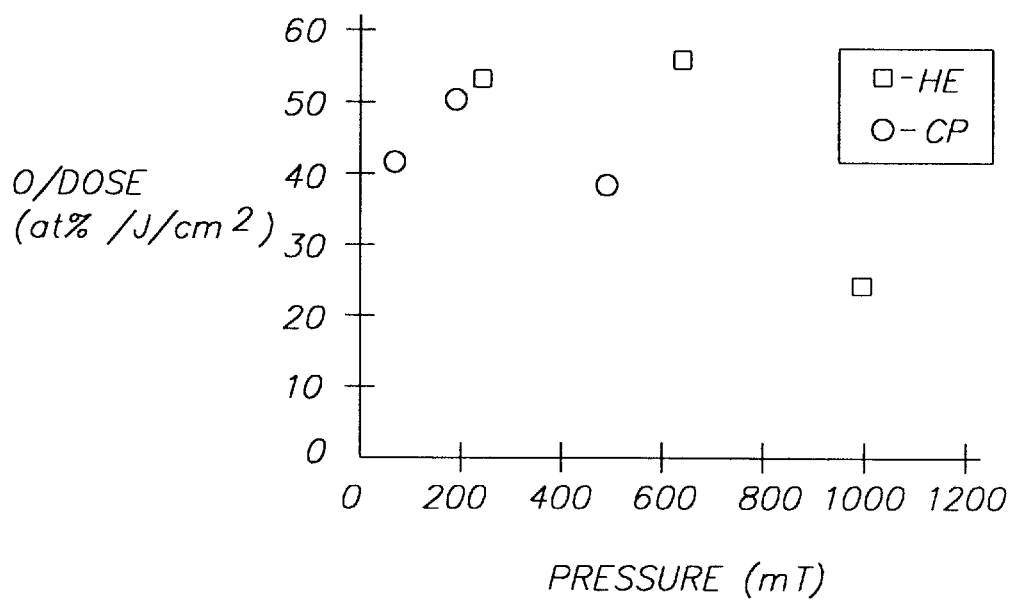
FIG. 7 is a graph plotting the oxygen uptake/dose ratio (%O/Dose) as a function of pressure for a polypropylene surface treated using the configuration of FIG. 4 (HE) and, for comparison using a plasma treatment in which the web is electrically floating in the plasma (coplanar electrode configuration, CP).

As can be seen from Tables 2 and 3, both floating web and high-efficiency plasma treatments result in comparable addition of oxygen. Closer examination, however, reveals differences between the high-efficiency treatments and the floating-web treatments. These differences are illustrated in FIGS. 6 and 7. In FIG. 6, the dose response of polypropylene is plotted for floating web and high-efficiency plasma treatments. From the plot in FIG. 6 one can see that the high-efficiency treatments produce somewhat more oxygen incorporation at lower doses than for the floating web treatments. One can also see that the high efficiency treatments are somewhat less sensitive to operating pressure. These two points of comparison can be made more clearly by comparing the slope of the oxygen uptake versus dose at low doses. This value is obtained by taking the amount of incorporated oxygen and dividing it by the applied dose. This procedure is meaningful only at low doses where the response is reasonably linear. In effect this procedure amounts to a comparison of the slopes of the curves of % O versus dose in the limit of low doses. This procedure was carried out for. the data obtained at roughly 0.5 J/cm$^2$ and below yielding the plot shown in FIG. 7, where the oxygen uptake/dose ratio is plotted against the treatment pressure for both floating web and high-efficiency treatments of polypropylene.

As can be seen from the plots in FIG. 7, the high-efficiency plasma treatment technique has a wider pressure range with higher oxygen uptake/dose ratio than for the floating web treatments. This rate is above 54 at %/J/cm$^2$ for pressures between 0.2 and 0.6 Torr in the case-of the high-efficiency treatments, while it drops from 50 down to 40 at %/J/cm$^2$ between pressures of 0.2 and 0.5 Torr for the floating web treatments.

Nitrogen treatments were also carried out on polypropylene using the high-efficiency treatment configuration. The results for these treatments and for floating web treatments of polypropylene in nitrogen plasmas are shown respectively in Tables 4 and 5.

TABLE 4

| Pressure (T) | Web speed (m/min) | Power W | Dose J/cm$^2$ | O Atom % | N Atom % | C Atom % |
|---|---|---|---|---|---|---|
| 0.25 | 152.4 | 450 | 0.054 | 1.4 | 1.5 | 97.1 |
| 0.25 | 27.4 | 449 | 0.297 | 4.5 | 9.3 | 86.2 |
| 0.25 | 15.2 | 451 | 0.538 | 5.5 | 13.9 | 82.6 |
| 0.62 | 15.2 | 213 | 0.254 | 5.4 | 8.1 | 86.5 |
| 0.90 | 152.4 | 450 | 0.054 | 1.2 | 1.3 | 97.5 |
| 0.93 | 15.2 | 450 | 0.537 | 2.2 | 8.4 | 89.4 |

Table 4. Surface chemistry data for high-efficiency nitrogen plasma treatment of polypropylene at various pressures, speeds, and powers.

TABLE 5

| Pressure (T) | Web speed (m/min) | Power W | Dose J/cm$^2$ | O Atom % | N Atom % | C Atom % |
|---|---|---|---|---|---|---|
| 0.2 | 3.8 | 50 | 0.24 | 2.9 | 4.6 | 92.5 |
| 0.2 | 3.8 | 50 | 0.24 | 2.0 | 3.9 | 94.1 |
| 0.2 | 3.8 | 400 | 1.91 | 6.7 | 13.3 | 80.0 |
| 0.2 | 3.8 | 750 | 3.58 | 6.8 | 12.6 | 80.6 |
| 0.2 | 3.8 | 750 | 3.58 | 5.8 | 11.5 | 82.7 |
| 0.225 | 3.8 | 50 | 0.24 | 1.6 | 3.9 | 94.5 |
| 0.231 | 3.8 | 750 | 3.58 | 4.5 | 13.7 | 81.8 |
| 0.3 | 3.8 | 50 | 0.24 | 5.1 | 5.8 | 89.1 |
| 0.3 | 3.8 | 750 | 3.58 | 9.0 | 16.4 | 74.6 |
| 0.5 | 3.8 | 50 | 0.24 | 4.7 | 4.3 | 91.0 |
| 0.5 | 3.8 | 650 | 3.10 | 7.7 | 15.8 | 76.5 |
| N/A | N/A | 0 | 0 | 0.2 | 0.0 | 99.8 |

Table 5. Surface chemistry data for floating-web nitrogen plasma treatments of polypropylene at various pressures and powers.

Figure 8:
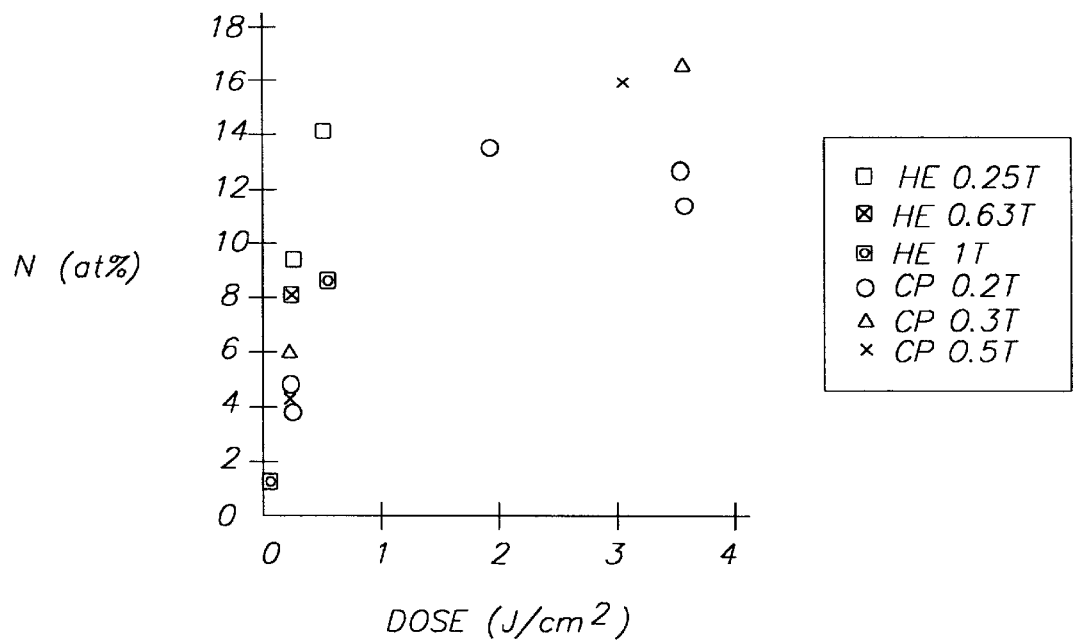
FIG. 8 is a graph plotting surface nitrogen as a function of treatment dose for a polypropylene surface using the high-efficiency (HE) configuration of FIG. 4 and; for comparison, using a plasma treatment in which the web is electrically floating in the plasma (coplanar electrode configuration, CP). Numbers beside the treatment configuration designation indicate the treatment pressure in Torr.
Figure 9:
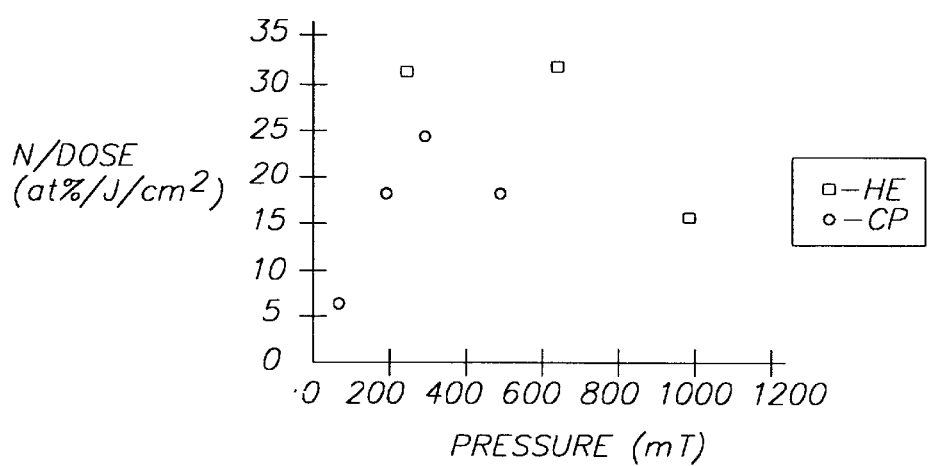
FIG. 9 is a graph plotting the nitrogen uptake/dose ratio (%N/Dose) as a function pressure for a polypropylene surface treated using the configuration of FIG. 4 (HE) and, for comparison, using a plasma treatment in which the web is electrically floating in an oxygen plasma (coplanar electrode configuration, CP).

The comparison of high-efficiency and floating-web treatments in nitrogen is similar to that found for oxygen treatments above. As before, a graphical comparison can be made from plots of incorporation versus dose. These data are plotted in FIG. 8. The procedure for calculating the nitrogen uptake/dose ratio was carried out in identical fashion to the procedure used to calculate the oxygen uptake/dose ratio (but nitrogen content of the treated surfaces was used instead of oxygen content). The resultant uptake/dose ratios are shown in FIG. 9. Similarly to what was shown for oxygen treatments above, the nitrogen plasma treatments using the high-efficiency technique have higher uptake/dose ratios over a wider pressure range than do the floating-web nitrogen plasma treatments.

The high-efficiency plasma treatment technique was also applied to polyethylene surfaces and compared with CDT and floating web treatments. The data for high-efficiency oxygen plasma treatment and CDT treatment are respectively shown in Tables 6 and 7.

TABLE 6

| Pressure (T) | Web speed (m/min) | Power W | Dose J/cm$^2$ | O Atom % | N Atom % | C Atom % | % O—C=O |
|---|---|---|---|---|---|---|---|
| 0.25 | 152.4 | 430 | 0.053 | 9.1 | 0 | 90.9 | 0.64 |
| 0.25 | 27.4 | 450 | 0.299 | 18.2 | 0 | 81.8 | 2.78 |
| 0.25 | 15.2 | 440 | 0.539 | 19.5 | 0 | 80.5 | 3.38 |
| 0.63 | 15.2 | 260 | 0.253 | 15.2 | 0 | 84.8 | 2.63 |
| 0.97 | 152.4 | 540 | 0.053 | 4.7 | 0 | 95.3 | 0.38 |
| 0.96 | 15.2 | 500 | 0.537 | 14.4 | 0 | 85.6 | 2.48 |

Table 6. Surface chemical analysis of polyethylene subsequent to high-efficiency oxygen plasma treatments at various pressures, powers, and speeds.

TABLE 7

| Dose(J/cm$^2$) | O (atom %) | % NOx | % O—C=O |
|---|---|---|---|
| 0.000 | 0 | 0 | 0 |
| 0.017 | 3.6 | — | — |
| 0.024 | 4.8 | — | — |
| 0.032 | 5.8 | — | — |
| 0.037 | 6.1 | — | — |
| 0.040 | 5.9 | — | — |
| 0.046 | 6.1 | — | — |
| 0.069 | 8.2 | — | — |
| 0.098 | 5.4 | — | — |
| 0.129 | 11 | 0.4 | 1.4 |

TABLE 7-continued

| Dose(J/cm$^2$) | O (atom %) | % NOx | % O—C=O |
|---|---|---|---|
| 0.291 | 14.5 | 0.9 | 1.9 |

Table 7. Surface chemical analysis of CDT treated polyethylene at various doses: incorporated oxygen as a function of dose. In addition levels of NOx and O—C=O are indicated for samples treated at the two highest doses.

TABLE 8

| Pressure (T) | Web speed (m/min) | Power W | Dose J/cm$^2$ | O Atom % | N Atom % | C Atom % |
|---|---|---|---|---|---|---|
| 0.25 | 152.4 | 452 | 0.054 | 3.1 | 1.9 | 95.0 |
| 0.25 | 27.4 | 450 | 0.298 | 3.2 | 8.8 | 88.0 |
| 0.25 | 15.2 | 450 | 0.537 | 4.3 | 13.4 | 82.3 |
| 0.63 | 15.2 | 211 | 0.252 | 2.4 | 8.0 | 89.6 |
| 0.91 | 152.4 | 434 | 0.052 | 1.3 | 1.0 | 97.7 |
| 0.91 | 15.2 | 449 | 0.535 | 4.7 | 7.2 | 88.1 |

Table 8. Surface chemical analysis of polyethylene subsequent to high-efficiency nitrogen plasma treatments at various pressures, powers, and speeds From Tables 6 and 7, it can be seen that CDT and high-efficiency plasma treatments of polyethylene result in comparable oxygen incorporation at comparable doses. A key difference, however, is that the CDT treatments produce a washable layer as evidenced by the reduced oxygen content after water washing, whereas the high-efficiency treatments in oxygen do not produce a washable layer. In addition, CDT treatments produce oxides of nitrogen in the treatment zone, and these species result in observable oxides of nitrogen on the treated surfaces. In contrast, high-efficiency plasma treatments in oxygen do not result in a significant washable layer, nor do they produce oxides of nitrogen (NOx) on the treated surfaces. The data shown in Table 9 illustrate these differences between CDT and high-efficiency oxygen plasma treatment.

Figure 10:
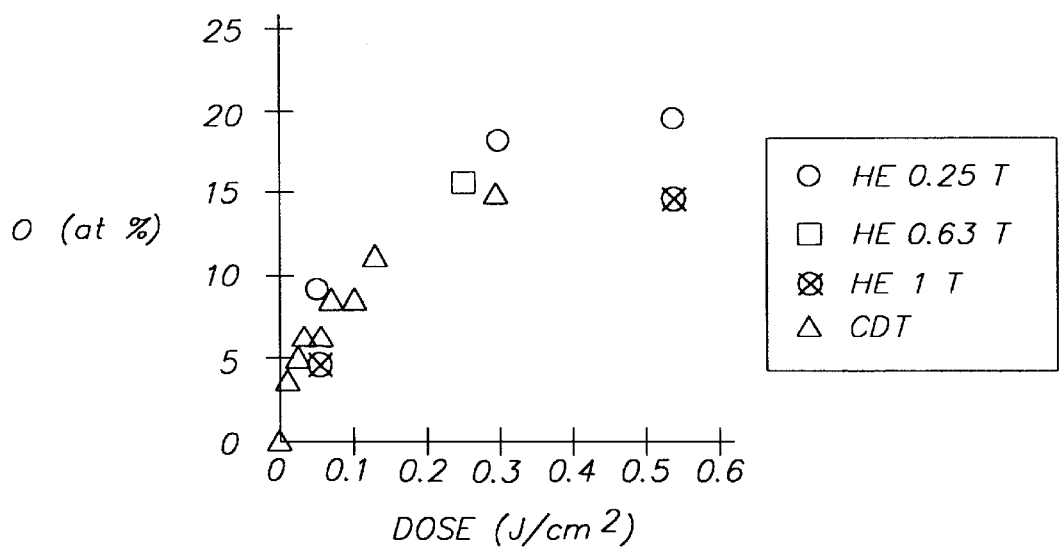
FIG. 10 is a graph plotting surface oxygen as a function of treatment dose for high-efficiency (HE) oxygen plasma treatment of a polyethylene surface using the configuration of FIG. 4 and, for comparison, CDT treatment of a similar polyethylene surface. The numbers beside the HE designation indicate the treatment pressure in Torr.
Figure 11:
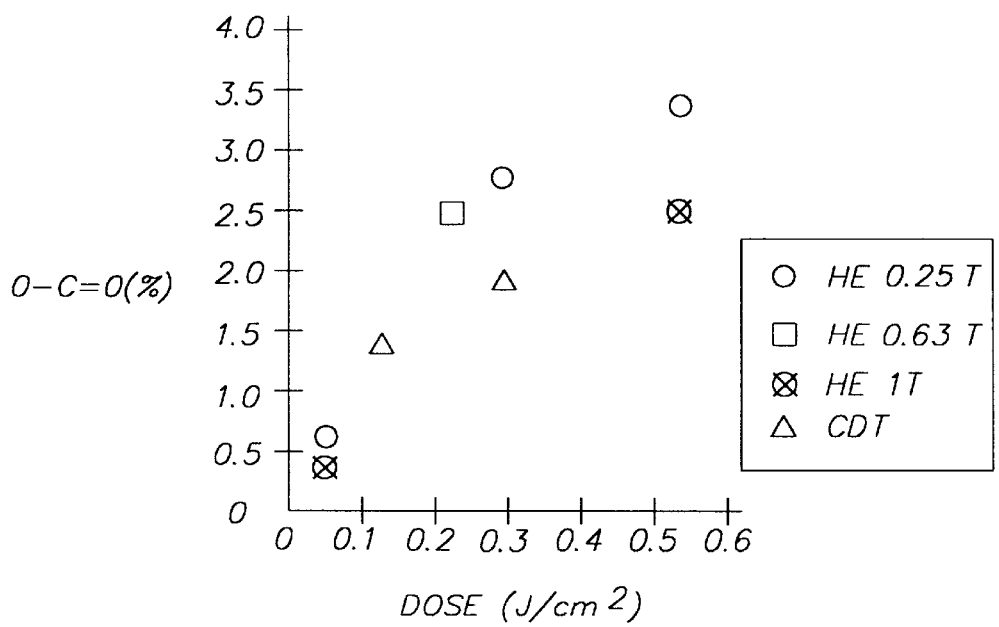
FIG. 11 is a graph plotting surface acid content (atom % carbon associated with carboxylic acid groups) as a function of treatment dose for high-efficiency (HE) oxygen plasma treatment of a polyethylene surface, and for CDT treatment of a similar polyethylene surface.

A more detailed examination of the data in Tables 6 and 7 is presented graphically in FIGS. 10 and 11. From FIG. 10, it can be seen that the high-efficiency treatments produce a somewhat higher degree of oxygen incorporation as a function of dose, when compared to CDT. This difference is more significant when the presence of the washable layer is taken into account. For CDT treated samples, the data in Table 9 suggest a limiting incorporation of 10% oxygen after washing, as samples with as much as 15% oxygen had only 10% remaining incorporated oxygen after washing. The loss of oxygen upon washing translates to a loss of acid groups upon washing, and would enhance the differences shown in FIG. 11 between high-efficiency plasma treatment and CDT treatment of polyethylene. As demonstrated for polypropylene above, the high-efficiency plasma treatments applied to polyethylene are also capable of generating significant chemical surface modification without the formation of significant washable layer, in contrast to what is seen for CDT treatments of the same materials.

Figure 5:
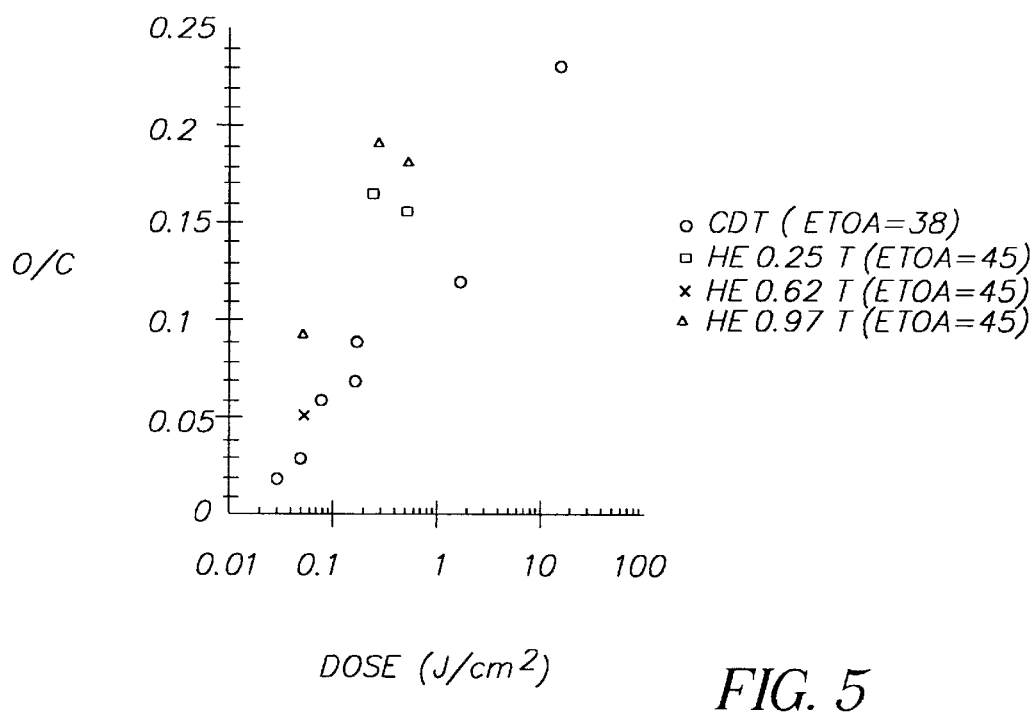
FIG. 5 is a graph plotting the ratio of surface oxygen to surface carbon as a function of treatment dose for a polypropylene surface treated using the high-efficiency (HE) configuration of FIG. 4 and, for comparison, using corona discharge treatment (data from Strobel et al). HE 0.25, HE 0.62, and HE 0.97 are respectively data for treatments at 0.25 Torr, 0.62 Torr, and 0.97 Torr.

The degree of oxygen incorporation as a function of dose for the high-efficiency treatments is similar for polyethylene (FIG. 10) and for polypropylene (FIGS. 5 and 6). For example, high-efficiency treatments at 0.25 T produce oxygen incorporation levels of roughly 15 atom % at doses of roughly 0.2 J/cm$^2$ for both polyethylene and polypropylene. In contrast, CDT requires considerably different doses for similar degrees of treatment for polyethylene (FIG. 10) and polypropylene (FIG. 5), with the doses being roughly an order of magnitude higher for polypropylene than for polyethylene. Furthermore, from Tables 6 and 7 and from FIG. 11, it can be seen that the high-efficiency treatments produce a higher amount of acid groups on the surface as a function of dose, when compared to CDT treatments of polyethylene. Thus the high-efficiency treatments produce more effective chemical modification of both polyethylene and polypropylene than does CDT with the further advantage of producing these effects at comparably low doses for both polyethylene and polypropylene. The high-efficiency treatment therefore provides considerable flexibility with respect to choice of material to be treated, as similar treatment processes can be applied to different materials to produce similar effects. In contrast, the use of CDT requires considerably different applied dose to obtain comparable surface chemistry on polyethylene and polypropylene. This difference in dose requirements translates to significant differences in process speed, input power, or both when changing from polyethylene to polypropylene.

TABLE 9

| Treatment | As-treated % O | As-treated % NOx | Washed % O | Washed % NOx |
|---|---|---|---|---|
| HE | 16.5 | 0 | 16 | 0 |
| CDT | 8.3 | — | 7.8 | — |
| CDT | 8.7 | — | 6.6 | — |
| CDT | 9 | 0.2 | 8.1 | 0.1 |
| CDT | 9.1 | — | 7.2 | — |
| CDT | 12.9 | 0.5 | 9.9 | 0.3 |
| CDT | 14.5 | 0.9 | 9.5 | 0.6 |
| CDT | 15.1 | 0.5 | 10.2 | 0.3 |
| CDT | 15.4 | 0.6 | 10.6 | 0.4 |

Table 9. Oxygen and NOx content of treated polyethylene surfaces before and after water washing. HE indicates high-efficiency oxygen plasma treatment; CDT indicates CDT treatments.

Figure 12:
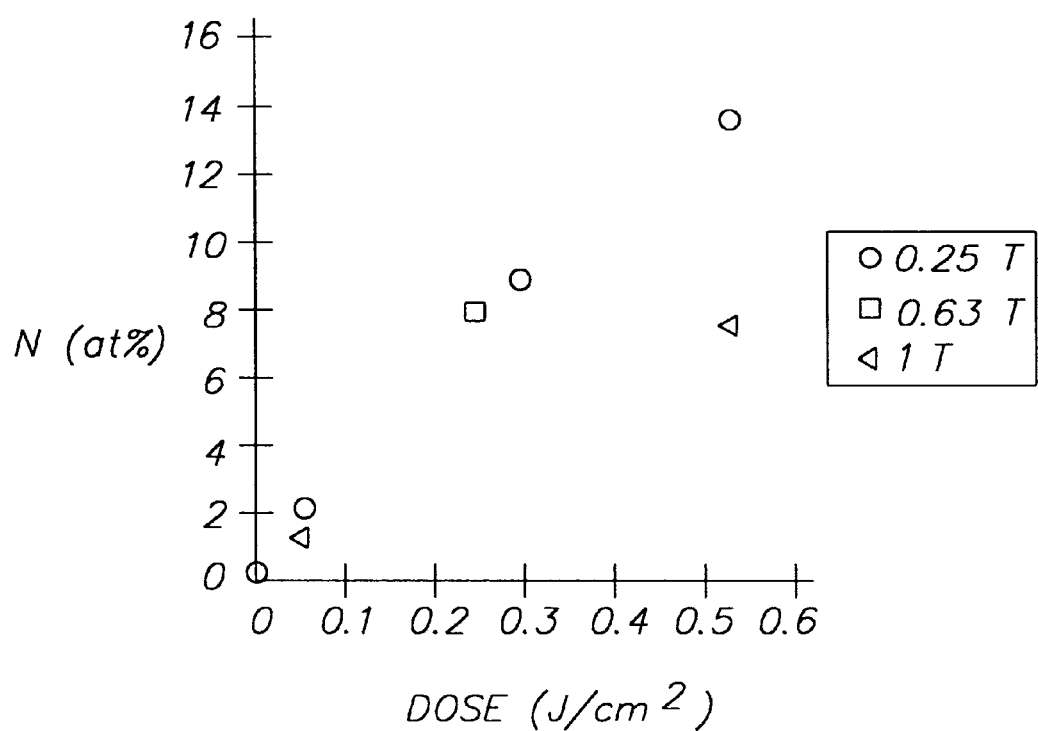
FIG. 12 is a graph plotting surface nitrogen as a function of high-efficiency (HE) treatment dose for a polyethylene surface using the configuration of FIG. 4 at various pressures. Treatment pressures are indicated in Torr.

The data in Table 8 for high-efficiency nitrogen plasma treatments of polyethylene also show that the high-efficiency treatment of polyethylene is similar to that of polypropylene. As can be seen from comparison of the % N and dose columns of Tables 4 and 8, comparable nitrogen incorporation is obtained at comparable doses for polyethylene and polypropylene. The dose response of polyethylene to high-efficiency nitrogen plasma treatment is shown graphically in FIG. 12. Comparison of FIGS. 8 and 12 show that the dose response of the polypropylene and polyethylene are similar-high efficiency plasma treatment in nitrogen at 0.25 T results in nitrogen incorporation of roughly 12 at % at a dose of roughly 0.5 J/cm$^2$. It should be noted that with standard CDT in air at one atmosphere, no significant nitrogen incorporation is obtained, except for the formation of small amounts of oxides of nitrogen, because the oxygen present in air dominates the gas phase chemistry in the treatment zone.

The examples presented in Tables 1–3 and FIGS. 5–7 establish that low-frequency treatments with the web on a driven electrode that is significantly smaller than its counter electrode can produce unexpectedly high efficiency of oxygen incorporation than typical CDT treatments carried out at atmospheric pressure and shows improvements in efficiency and pressure range of operation relative to floating web treatments in oxygen. The examples presented in Tables 4 and 5 as well as FIGS. 8 and 9 demonstrate improved efficiency and pressure range of operation relative to floating web treatments for nitrogen plasmas. The examples presented in Tables 6–8 and FIGS. 10 and 12 demonstrate that the high-efficiency plasma treatment of polyethylene in oxygen or nitrogen produces comparable effects to those on polypropylene. In contrast, the CDT treatments are considerably less efficient on polypropylene than on polyethylene (as seen by comparison of FIGS. 5 & 6 with FIG. 10. In addition, FIG. 11 shows that the high-efficiency plasma treatment of polyethylene produces a higher level of incorporated acid groups than does CDT at comparable doses. This effect is even more significant if one takes into account the fact that CDT of polyethylene produces washable layers at high doses. At comparable levels of oxygen incorporation, the high-efficiency plasma treatments show no loss of incorporated oxygen, whereas the CDT treatments show significant loss of incorporated oxygen after water washing.

To the extent that ion bombardment on the smaller electrode or energetic secondary electrons emitted as a consequence are important in determining the resultant surface chemistry, there will be maximum frequency beyond which the surprising benefits of placing the sample on the driven smaller electrode are lost. This maximum frequency can be determined empirically by those skilled in the art. The complications associated with power delivery and impedance matching in the high-frequency range can occur above 2 MHz. Hence the useful range of this invention can be considered to be below about 2 MHz.

The lowest frequency that this invention can likely be used is determined by the charging characteristics of the support surface in the presence of the plasma. If the support surface charges quickly compared to the period of the driving voltage, the plasma may acquire a pulsed character, as the support surface will rapidly acquire the floating potential, thereby reducing the electric field across the cathode sheath and limiting the useful portion of the discharge cycle. Chapman (see p.142) estimates the charging time (in seconds) as $t_c=CV/i$, where C is the capacitance of the polymer/electrode, V is the applied voltage, and i is the discharge current. The discharge current depends on geometry and plasma conditions, but is typically of the order $10^{-3}$ A/cm$^2$. As an example, for typical polyesters, the dielectric constant is roughly 3, and the capacitance C is then given by $C=3.2\times10^{-13}/d$ (in units of F/cm$^2$), where d is the thickness of the polymer web in cm. The discharge voltage, V, depends on the electrode geometry and the discharge gas, as governed by the Paschen relation. Typical values at low frequencies, however, are roughly 1000 V. Hence, the charging time $t_c$ is expected to be roughly $3.2\times10^{-7}/d$ seconds. Hence, for $100\mu$ thick polyester base, the charging time is roughly 32 $\mu$s, corresponding to a lower operating frequency of roughly 30 kHz. In comparison, $10\mu$ thick polyesters could be treated at frequencies as low as 3 kHz, and 1 mm thick polyesters would require driving frequencies above 300 kHz. As indicated above, however, the exact value of the minimum operating frequency depends on the dielectric constant of the polymer web, driving voltage, and discharge current, the latter two parameters in turn depending on geometry, gas in the discharge, and applied power. The general limitation is that the minimum driving frequency be comparable to $1/t_c$. Based on the $1/t_c$ criterion, one skilled in the art can determine a suitable lower bound of operating frequency for the polymer web and treatment apparatus used.

Although the treatment electrodes 16, 52, 104 have been described herein as being the driven electrodes, it should be understood that the method and apparatus of the present invention can also be practiced by driving the second electrodes 26, 64, 114 and grounding the treatment electrodes 16, 52, 104. The treatment electrodes 16, 52, 104 remain the treatment electrodes and have a surface area in the treatment zone which is not greater than the surface area of the counter electrode. Further, the treatment configurations as depicted in the FIGS. 1–3 remain the same with the exception that the second electrodes 26, 64, 114 become the driven electrodes.

From the foregoing, it will be seen that this invention is one well adapted to obtain all of the ends and objects herein above set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for treating webs having polyolefin-containing surfaces with a plasma comprising the steps of:
    (a) supplying a treatment gas to a treatment zone;
    (b) driving either a treatment electrode or a counter electrode with an oscillating high voltage at a frequency less than about 2 MHz and greater than $1/t_c$ where $t_c$ is the charging time of a web surface exposed to a rms ion current in the plasma, the treatment electrode having a surface area in the treatment zone which is not greater than a surface area of the counter electrode;
    (c) generating a plasma in the treatment zone with the treatment electrode;
    (d) conveying a web having a polyolefin-containing surface through the treatment zone; and
    (e) incorporating the treatment gas into the polyolefin-containing surface in the form of reactive species.

2. A method as recited in claim 1 wherein:
the reactive species are not water soluble.

3. A method as recited in claim 1 wherein:
the web having the polyolefin-containing surface receives a treatment dose of less than 0.5 J/cm$^2$.

4. A method as recited in claim 3 further comprising the step of:
subsequently coating the polyolefin-containing surface of the web with a photosensitive layer.

5. A method as recited in claim 3 further comprising the step of:
subsequently coating the polyolefin-containing surface of the web with a non-photosensitive layer.

6. A method as recited in claim 5 wherein:
the treatment gas is nitrogen and the non-photosensitive layer is reactive with amines or imines.

7. A method as recited in claim 5 wherein:
the treatment gas is nitrogen and adhesion of the non-photosensitive layer is promoted by the presence of amines or imines.

8. A method as recited in claim 5 wherein:
the treatment gas is oxygen and the non-photosensitive layer is reactive with hydroperoxy, ether, hydroxyl, epoxy, carboxyl, or carbonyl groups.

9. A method as recited in claim 5 wherein:
the treatment gas is oxygen and adhesion of the non-photosensitive layer is promoted by the presence of hydroperoxy, ether, hydroxyl, epoxy, carboxyl, or carbonyl groups.

10. A method as recited in claim 3 further comprising the step of:
subsequently coating the polyolefin-containing surface of the web with an imaging layer.

11. A method as recited in claim 10 wherein:
the imaging layer is an ink receiving layer.

12. A method as recited in claim 1 wherein:
the reactive species are amines, imines, carboxyl, carbonyl, hydroperoxy, ether, hydroxy, or epoxy groups.

13. A method as recited in claim 1 wherein:
the polyolefin-containing surface of the web is a polypropylene-coated paper support or a composite comprising a polypropylene-containing layer applied above at least one polymer layer which is applied to paper.

14. A method as recited in claim 1 wherein:
the web and the polyolefin-containing surface thereof is a polyethylene-coated paper support or a composite comprising a polyethylene-containing layer applied above at least one polymer layer which is applied to paper.

15. A method as recited in claim 1 wherein:
the polyolefin-containing surface of the web includes polypropylene, polyethylene, or mixtures thereof.

16. A method for treating webs having polyolefin-containing surfaces with a plasma comprising the steps of:
    (a) supplying a treatment gas to a treatment zone;
    (b) driving a treatment electrode with an oscillating high voltage at a frequency less than about 2 MHz and greater than $1/t_c$ where $t_c$ is the charging time of a web surface exposed to a rms ion current in the plasma, the treatment electrode having a surface area in the treatment zone which is not greater than a surface area of a counter electrode;
    (c) generating a plasma in the treatment zone with the treatment electrode; and
    (d) conveying a web having a polyolefin-containing surface through the treatment zone and generating a surface on the web having the treatment gas incorporated therein in the form of reactive species, the reactive species not being removable by washing.

17. A method as recited in claim 16 wherein:
the web and the polyolefin-containing surface thereof is a polyethylene-coated paper support or a composite comprising a polyethylene-containing layer applied above several polymer layers which are applied to paper.

18. A method as recited in claim 16 wherein:
the web and the polyolefin-containing surface thereof is a polyethylene-coated paper support or a composite comprising a polyethylene-containing layer applied above at least one polymer layer which is applied to paper.

19. A method as recited in claim 16 wherein:
the reactive species are amines, imines, carboxyl, carbonyl, hydroperoxy, ether, hydroxy, or epoxy groups.

20. A method as recited in claim 16 wherein:
the polyolefin-containing surface of the web includes polypropylene, polyethylene, or mixtures thereof.

21. A method as recited in claim 16 wherein:
the polyolefin-containing surface of the web is a polypropylene-coated paper support or a composite comprising a polypropylene-containing layer applied above at least one polymer layer which is applied to paper.

* * * * *